US008922797B2

(12) United States Patent
Watase

(10) Patent No.: US 8,922,797 B2
(45) Date of Patent: Dec. 30, 2014

(54) METHODS FOR EMULATING THE PRINTING RANGE OF AN IMAGE FORMING APPARATUS VIA A PRINTER DRIVER

(75) Inventor: Shinichiro Watase, Osaka (JP)

(73) Assignee: KYOCERA Document Solutions Inc. (JP)

( * ) Notice: Subject to any disclaimer, the term of this patent is extended or adjusted under 35 U.S.C. 154(b) by 291 days.

(21) Appl. No.: 13/558,550

(22) Filed: Jul. 26, 2012

(65) Prior Publication Data

US 2013/0027731 A1 Jan. 31, 2013

(30) Foreign Application Priority Data

Jul. 26, 2011 (JP) ................................ 2011-162912

(51) Int. Cl.
*G06F 3/12* (2006.01)
(52) U.S. Cl.
CPC ............ *G06F 3/1209* (2013.01); *G06F 3/1225* (2013.01); *G06F 3/1245* (2013.01)
USPC ........................... 358/1.13; 358/1.15; 358/1.1
(58) Field of Classification Search
None
See application file for complete search history.

(56) References Cited

U.S. PATENT DOCUMENTS

| 7,466,442 | B2* | 12/2008 | Chapman | 358/1.18 |
| 8,059,306 | B2* | 11/2011 | Watase | 358/1.2 |
| 2002/0067498 | A1* | 6/2002 | Chapman | 358/1.13 |
| 2005/0157321 | A1* | 7/2005 | Alacar | 358/1.13 |
| 2007/0252857 | A1* | 11/2007 | Watase | 347/5 |
| 2011/0058205 | A1* | 3/2011 | Araki | 358/1.13 |

FOREIGN PATENT DOCUMENTS

JP 2010-003216 1/2010

* cited by examiner

*Primary Examiner* — Marcus T Riley
(74) *Attorney, Agent, or Firm* — McDonnell Boehnen Hulbert & Berghoff LLP

(57) ABSTRACT

Example embodiments disclosed herein relate to methods for emulating a printing range, on a sheet of paper, of a first image forming apparatus by a second image forming apparatus. An example method includes starting a first printer driver for a first image forming apparatus, obtaining printing range information of the first image forming apparatus from the first printer driver, and creating a plug-in file based on the printing range information of the first image forming apparatus. The plug-in file may include a function for changing a printing range for a second printer driver for a second image forming apparatus. The example method also includes installing the plug-in file into the second printer driver.

9 Claims, 8 Drawing Sheets

METHODS FOR EMULATING THE PRINTING RANGE OF AN IMAGE FORMING APPARATUS VIA A PRINTER DRIVER

INCORPORATION BY REFERENCE

This application is based upon, and claims the benefit of priority from, corresponding Japanese Patent Application No. 2011-162912, filed in the Japan Patent Office on Jul. 26, 2011, the entire contents of which is incorporated herein by reference.

BACKGROUND

1. Field

The present disclosure relates to a method for emulating a printing range of an image forming apparatus via a printer driver.

2. Description of the Related Art

Due to differences in hardware configurations, an image forming apparatus' printing range may vary, despite printing on the same size paper, based on the model of the image forming apparatus.

When an application is created corresponding to a printing range of a specified model of an image forming apparatus and the image forming apparatus that is currently used is not included in the specified model, the application cannot be used.

Typical methods to address this problem include using a printer control device including printer drivers A and B, which obtain printing range information from the printer drivers A and B to calculate a correction value as the difference between the printing ranges of the printer drivers A and B, and correct a printing position for each drawing object.

However, in the above-described typical technology, if the printer driver B cannot be obtained, the correction value cannot be calculated. In addition, the correction of the printing position is performed for each drawing object, thereby creating a delay in printing speed. Further, even when the printer driver B is obtained, a user must still specify the printer driver B and obtain the correction value through a graphic user interface (GUI), making an operation troublesome.

SUMMARY

The present disclosure relates to a method for emulating a printing range of an image forming apparatus via the printer driver, which enables the printing range of the image forming apparatus to be changed easily without obtaining the printer driver of other model by the user.

According to an aspect of the present disclosure, a method is provided. The method includes starting, using a computer processor, a first printer driver for a first image forming apparatus. The method also includes obtaining printing range information of the first image forming apparatus from the first printer driver. The method additionally includes creating a plug-in file based on the printing range information of the first image forming apparatus. The plug-in file includes a function for changing a printing range for a second printer driver for a second image forming apparatus. The method further includes installing the plug-in file into the second printer driver.

According to another aspect of the present disclosure, another method is provided. The method includes starting, using a computer processor, a first printer driver for a first image forming apparatus. The method includes obtaining printing range information relating to the first image forming apparatus from the first printer driver. The method also includes creating printing range change source code based on the printing range information of the first image forming apparatus. The printing range change source code includes a function for changing a printing range for a second printer driver for a second image forming apparatus. The method additionally includes creating a first object file by compiling source code of the second printer driver. The method further includes creating a second object file by compiling the printing range change source code. The method yet further includes building a new second printer driver by linking the first object file and the second object file.

According to yet another aspect of the present disclosure, a third method is provided. The method includes starting, using a computer processor, a first printer driver for a first image forming apparatus. The method also includes obtaining printing range information of the first image forming apparatus from the first printer driver. The method additionally includes creating a printing range setting data file based on the printing range information of the first image forming apparatus. The printing range setting data file includes a function for changing a printing range for a second printer driver for a second image forming apparatus. The method further includes installing the printing range setting data file into the second printer driver.

DETAILED DESCRIPTION

First Embodiment

Figure 1:
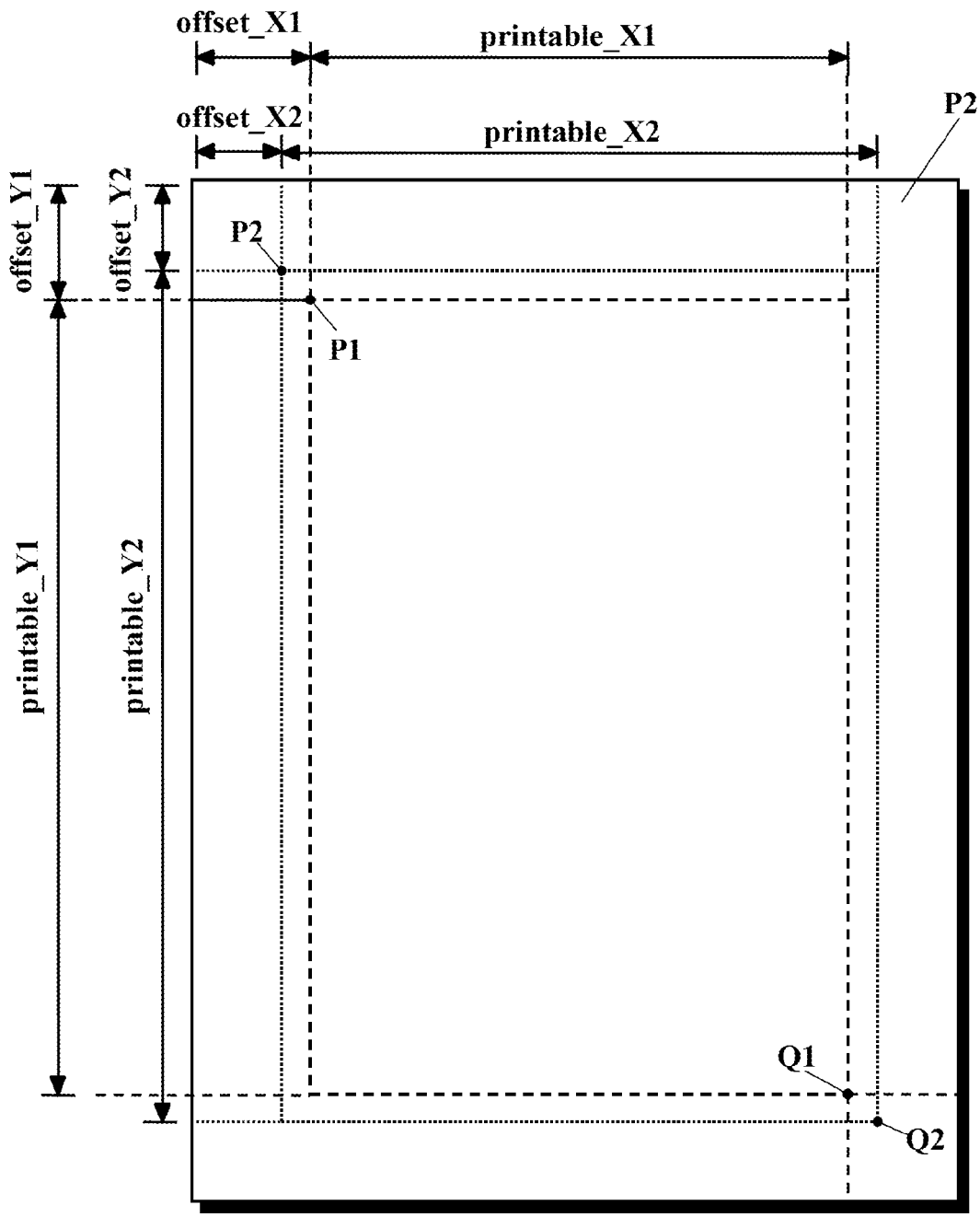
FIG. 1 is a schematic diagram illustrating printing ranges on a sheet of paper of an image forming apparatus of different models.

FIG. 1 is a schematic diagram illustrating the printing ranges on the sheet of paper P of the image forming apparatus of the different models.

The printing range of the image forming apparatus of a first model shows a rectangular range having diagonal points of P1 and Q1, specified by offset amounts in a right direction (X direction) and a downward direction (Y direction) from an upper left corner of P1 (offset_X1 and offset_Y1) and a width printable_X1 in the X direction and a width printable_Y1 in the Y direction of the printable range. Similarly, the printing range of the image forming apparatus of a second model shows the rectangular range having diagonal points of P2 and Q2, specified by the offset amounts in the X direction and the Y direction from the upper left corner of P2 (offset_X2 and offset_Y2) and the width printable_X2 in the X direction and the width printable_Y2 in the Y direction of the printable range.

A method is described below, in which an application is created based on the printing range of the image forming apparatus of the first model (for example, an image forming apparatus 10 illustrated in FIG. 2), to emulate the printing range of the image forming apparatus 10 of the first model on the image forming apparatus of the second model (for example, an image forming apparatus 11 illustrated in FIG. 3).

In a first embodiment of the present disclosure, a printer driver of the image forming apparatus 11 may be a plug-in type.

Figure 2:
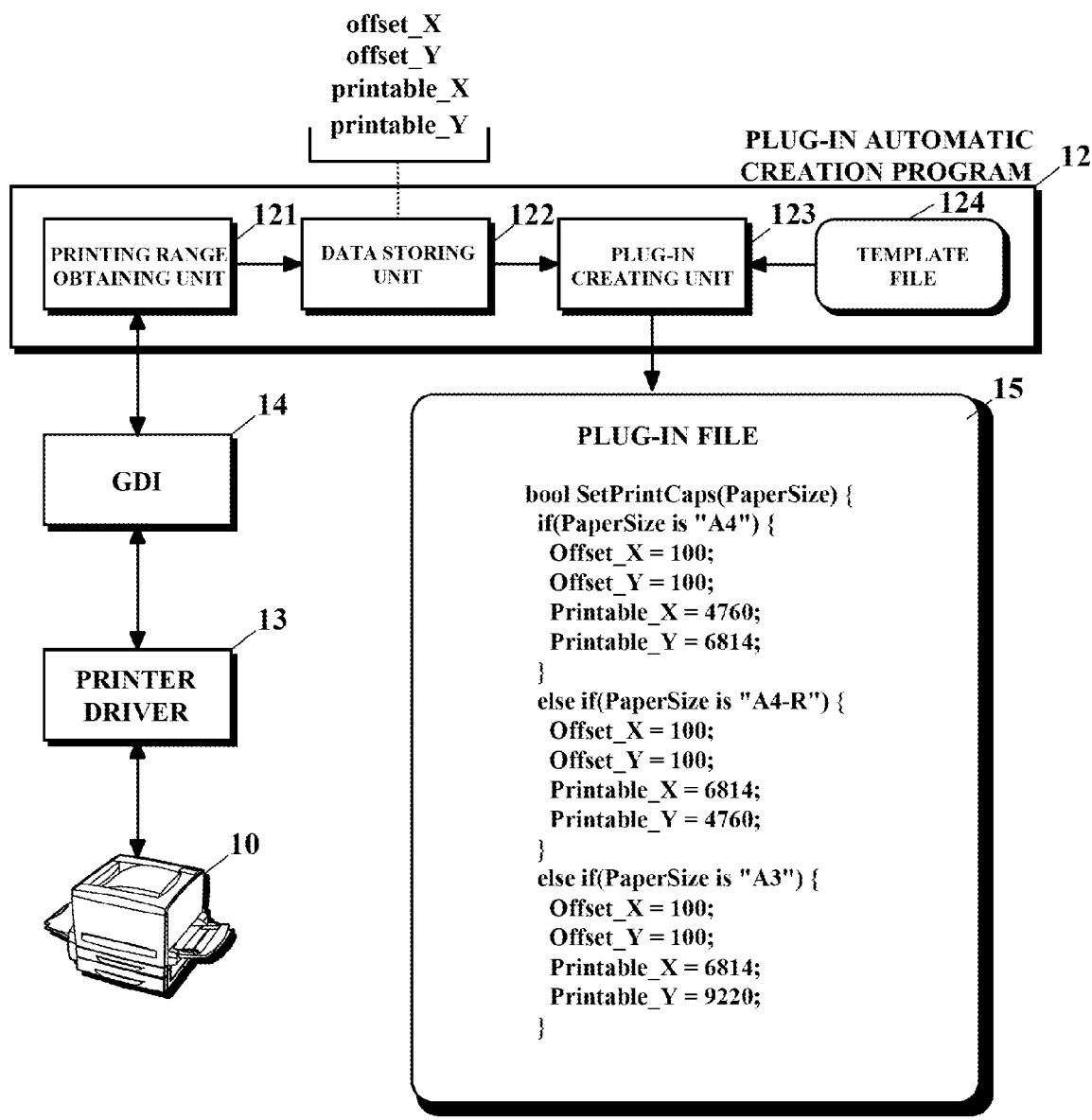
FIG. 2 is a block diagram illustrating a configuration of software that may create a plug-in file according to a first embodiment of the present disclosure.

FIG. 2 is a block diagram illustrating the configuration of software that creates a plug-in file according to the first embodiment.

A plug-in automatic creation program 12 may include a printing range obtaining unit 121, a data storing unit 122, a plug-in creating unit 123, and a template file 124.

The printing range obtaining unit 121 may obtain printing range information of the image forming apparatus 10 from a printer driver 13 for the image forming apparatus 10 via a graphics device interface (GDI) 14 that is a library function of an operating system. Then, the obtained printing range information may be stored in the data storing unit 122. The printing range information may include data such as the above-described offset_X1, offset_Y1, printable_X1, and printable Y1. The plug-in creating unit 123 may create a plug-in file 15 by assigning the data of the printing range information to a parameter included in the template file 124 in response to the storing of the printing range information. A function SetPrintCaps (PaperSize) included in the plug-in file 15 is a pseudo function for describing logic of this embodiment.

Figure 3:
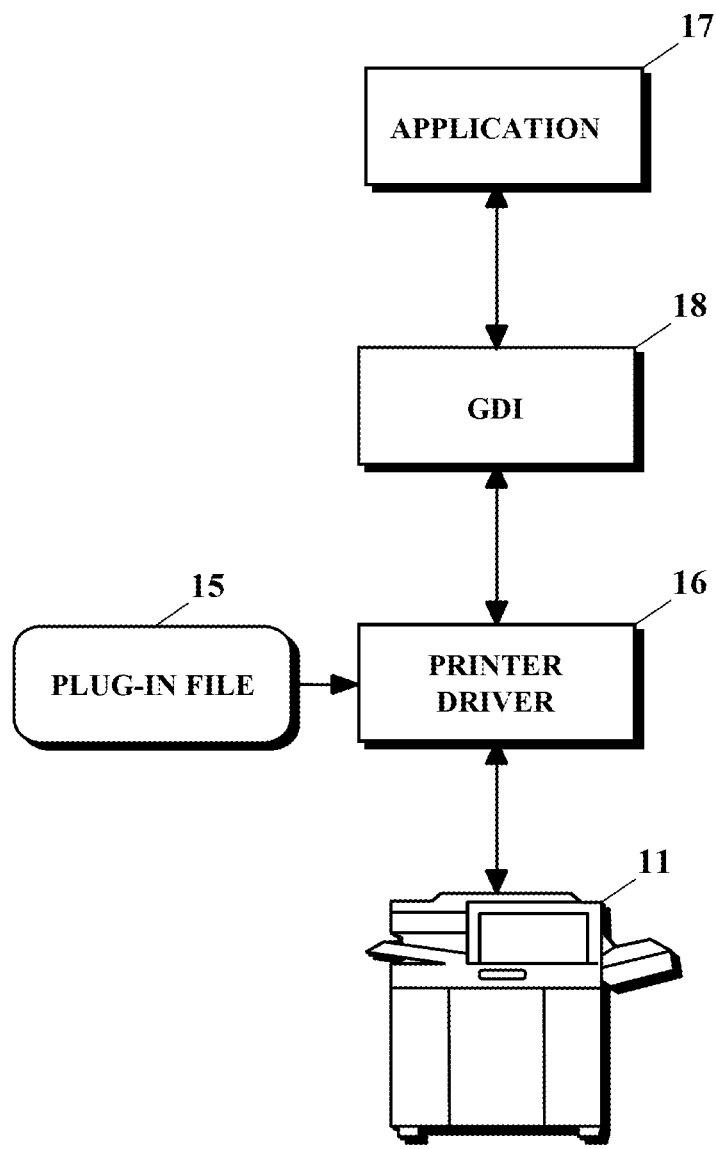
FIG. 3 is a block diagram illustrating a configuration of a printing system according to the first embodiment.

FIG. 3 is a block diagram illustrating the configuration of a printing system according to the first embodiment.

The plug-in file 15 may be installed into a printer driver 16. This installation may be performed by, for example, storing the plug-in file 15 in a specified folder on a personal computer (PC) that includes the printer driver 16.

Figure 4:
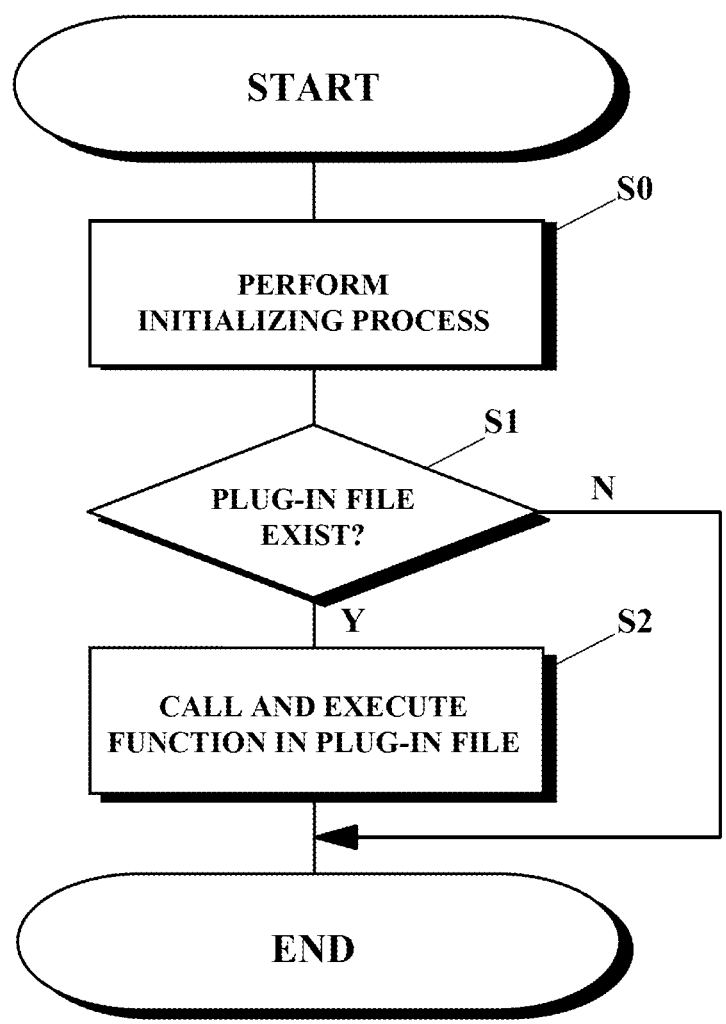
FIG. 4 is a flowchart illustrating an initializing process in a printer driver according to the first embodiment.

When an application 17 activates the printer driver 16 via a GDI 18, an initializing process illustrated in FIG. 4 may be first performed regardless of presence or absence of the plug-in file 15.

FIG. 4 is a flowchart illustrating the initializing process in the printer driver according to the first embodiment.

The initializing process may be performed even when the plug-in file 15 does not exist (Step S0). Using the initializing process, the data of the printing range information of the image forming apparatus 11 may be set to the original data. That is, offset_X2 and offset_Y2 are set to the offset amounts of the printing range in the X direction and the Y direction, respectively, and printable_X2 and printable_Y2 are set to the widths of the printing range in the X direction and the Y direction, respectively.

Next, it may be determined whether or not the plug-in file exists in the specified folder (Step S1). When the plug-in file exists in the specified folder, the process control may move to Step S2, and when the plug-in file does not exist in the specified folder, the process control may end the initializing process.

The function SetPrintCaps (PaperSize) included in the plug-in file 15 may be called and executed for a paper size that can be used in the image forming apparatus 11 (Step S2). With this process, the printing range of the image forming apparatus 11 may be rewritten with the printing range of the image forming apparatus 10 for the paper size that may be processed by the plug-in file 15 among the paper sizes.

Referring back to FIG. 3, the application 17 may send drawing data to the printer driver 16 via the GDI 18. The printer driver 16 may convert GDI data from the GDI 18 into PDL data by using finally set offset positions (offset_X, offset_Y) as the origin on the paper regardless of whether or not the printing range has been rewritten. This process eliminates the necessity of correcting a drawing position due to a difference in the offset position between the two drivers for each drawing object. The printer driver 16 may send the converted PDL data to the image forming apparatus 11. The image forming apparatus 11 may convert the PDL data into a display list (intermediate language), rasterize the display list, and perform a print out.

According to the first embodiment, the printing range information of the image forming apparatus 10 maybe obtained from the printer driver 13 of the image forming apparatus 10. The plug-in file 15 for changing the printing range for the printer driver 16 of the image forming apparatus 11 may be automatically created. The plug-in file 15 may be installed into the printer driver 16. In the printer driver 16, after the original printing range information is set in the initializing process, the function included in the plug-in file 15 may be called and executed when the plug-in file 15 exists. With this operation, a user may change the printing range of the image forming apparatus 11 corresponding to the printer driver 13 easily even without obtaining the printer driver 13 of the image forming apparatus 10, by being provided with the plug-in file 15 from a manufacturer or a dealer of the image forming apparatus 11.

Second Embodiment

In the first embodiment, the function included in the plug-in file 15 may be used in the initializing process by being dynamically linked to the printer driver 16. On the other hand, in a second embodiment of the present disclosure, the function may be statically linked to the printer driver 16.

Figure 5:
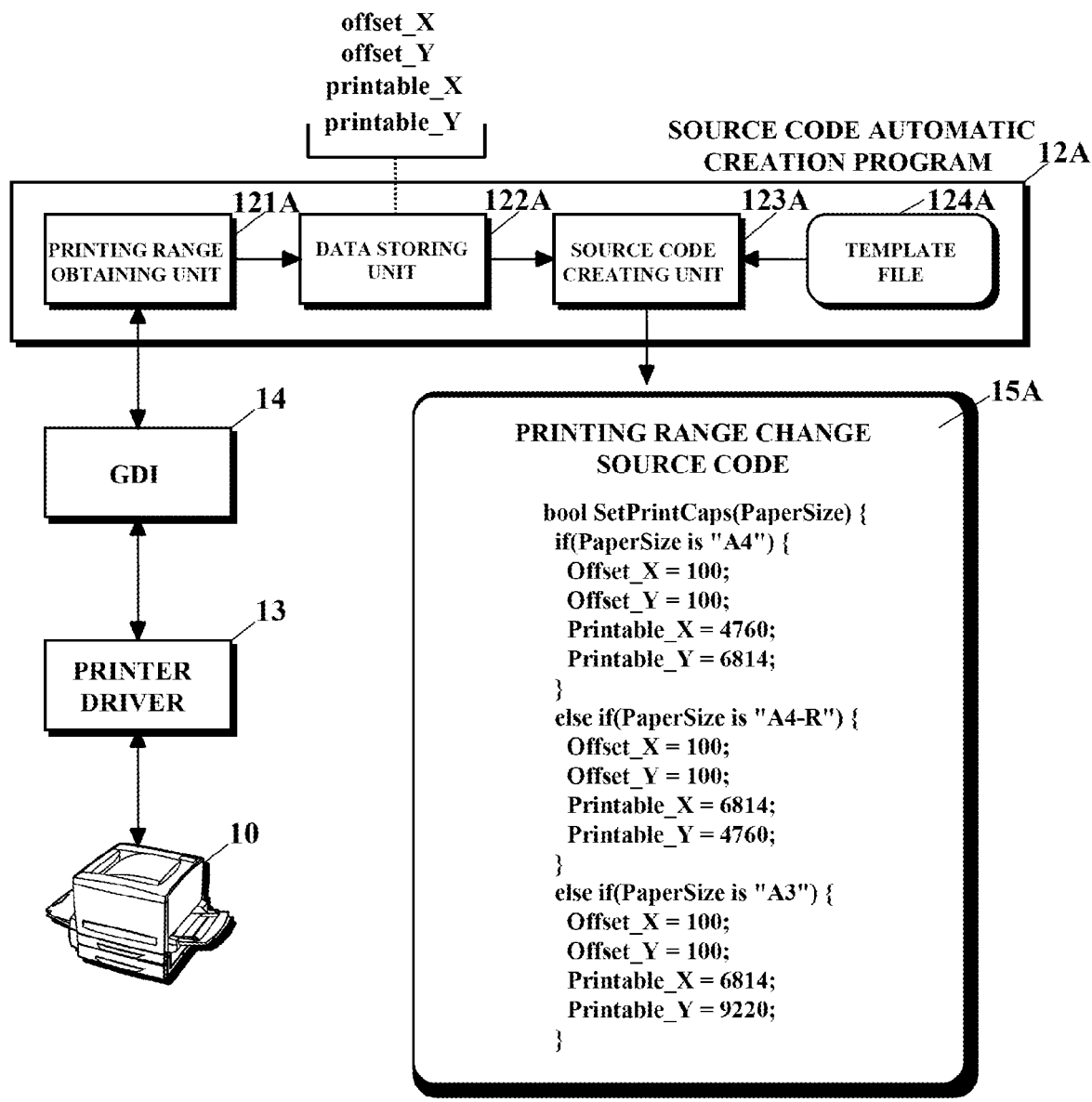
FIG. 5 is a block diagram illustrating a configuration of software that creates printing range change source code according to a second embodiment of the present disclosure.

FIG. 5 is a block diagram illustrating the configuration of software that may create printing range change source code according to the second embodiment.

In a source code automatic creation program 12A, the printing range change source code 15A may be created, instead of the plug-in file 15 illustrated in FIG. 2 of the first embodiment, by using a source code creating unit 123A instead of the plug-in creating unit 123 illustrated in FIG. 2 of the first embodiment. A function included in the printing range change source code 15A may be the same as the function included in the plug-in file 15 illustrated in FIG. 2 of the first embodiment. A printing range obtaining unit 121A, a data storing unit 122A, and a template file 124A may have the same or similar configurations of the printing range obtaining unit 121, the data storing unit 122, and the template file 124 illustrated in FIG. 2 of the first embodiment, respectively.

Figure 6:
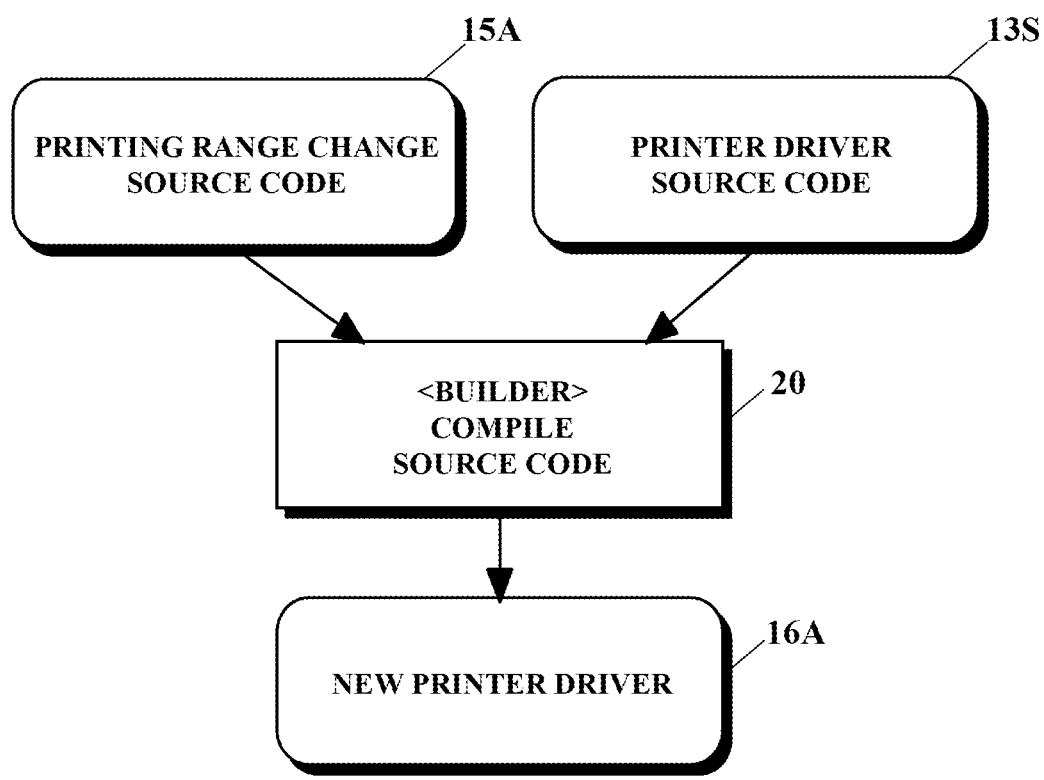
FIG. 6 is a flowchart illustrating a method of creating a printer driver according to the second embodiment.

FIG. 6 is a flowchart illustrating a method of creating a printer driver 16A according to the second embodiment.

A builder 20 may compile source code 13S of the printer driver 13 and may compile the printing range change source code 15A, thus creating an object file of the source code 13S of the printer driver 13 and an object file of the printing range change source code 15A. Further, the builder 20 may create a new printer driver 16A that has an executable format by linking the object file of the source code 13S of the printer driver 13 and the object file of the printing range change source code 15A with a linker (referred to as "linkage editor").

Next, a function included in the printing range change source code 15A may be called and executed in the same position and manner as the plug-in file of the first embodiment. That is, after Step S0 (FIG. 4), the initializing process, the function included in the printing range change source code 15A may be executed instead of Step S2 (FIG. 4). In the second embodiment, Step S1 (FIG. 4) may not exist.

According to the second embodiment, the printing range information of the image forming apparatus 10 maybe obtained from the printer driver 13 of the image forming apparatus 10, and the printing range change source code 15A for the printer driver 16 of the image forming apparatus 11 may be automatically created. The new printer driver 16A may be built by statically linking the object file of the printing range change source code 15A to the object file of source code of the printer driver 16. In the printer driver 16A, after the original printing range information is set during the initializing process, the function included in the printing range change source code 15A may be called and executed.

With this operation, the user may emulate the printing range of the image forming apparatus 10 on the printing range of the image forming apparatus 11 simply by executing the new printer driver 16A supplied from the manufacturer or the dealer of the image forming apparatus 11.

Third Embodiment

In the first and the second embodiments, for emulating the printing range of the image forming apparatus, the function is added to the printer driver 16 and the data of the printing range information is overwritten with the function. In a third embodiment of the present disclosure, the function may be provided in advance in the printer driver 16, and if a printing range setting data file exists, the printing range may be overwritten with contents of the printing range setting data file by calling and executing the function.

Figure 7:
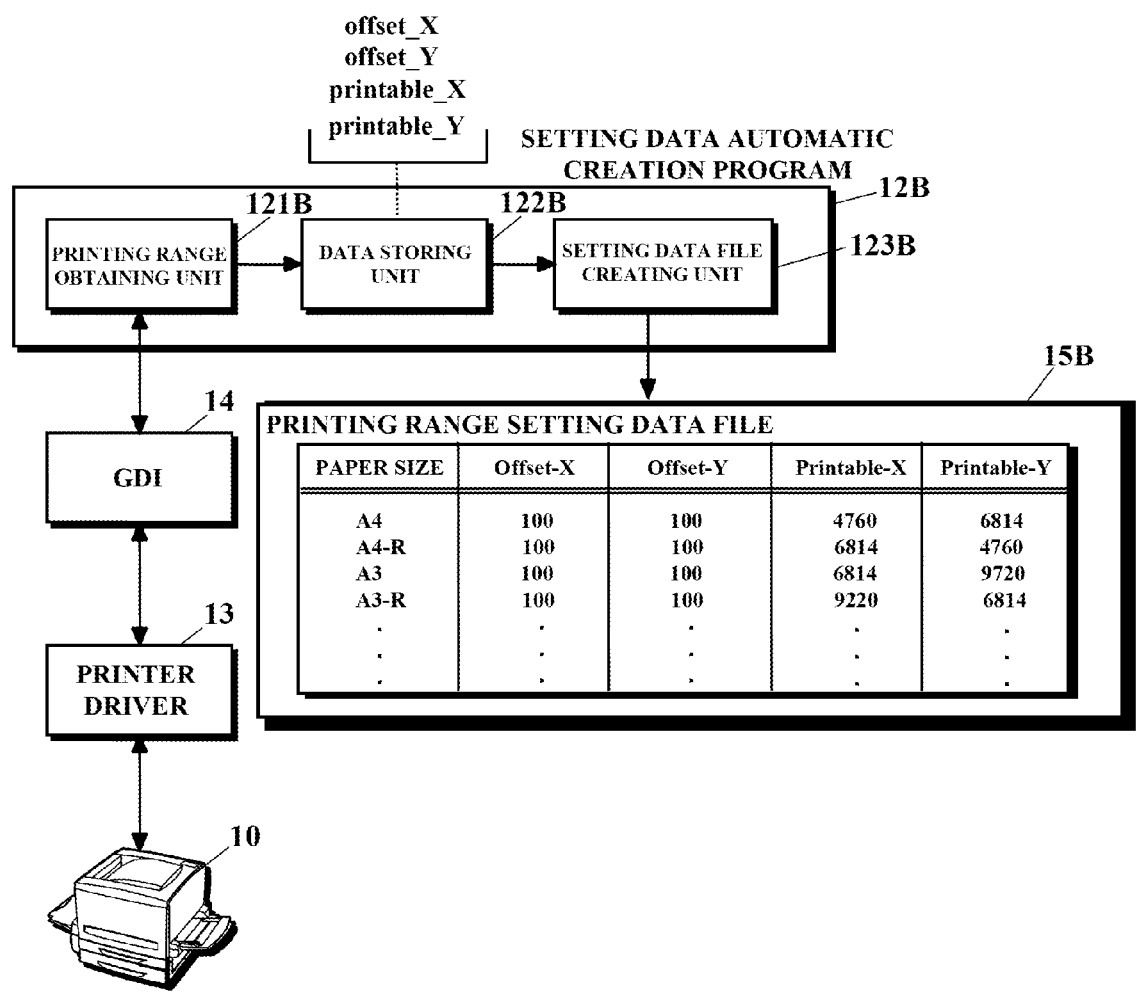
FIG. 7 is a block diagram illustrating a configuration of software that creates a printing range setting data file according to a third embodiment of the present disclosure.

FIG. 7 is a block diagram illustrating the configuration of software that creates the printing range setting data file according to the third embodiment.

In a setting data automatic creation program 12B, a printing range setting data file 15B, which is a table of printing range setting data for overwriting, may be created by using a setting data file creating unit 123B instead of the plug-in creating unit 123 illustrated in FIG. 2 of the first embodiment. A printing range obtaining unit 121B and a data storing unit 122B may have the same or similar configurations of the printing range obtaining unit 121 and the data storing unit 122 illustrated in FIG. 2 of the first embodiment, respectively.

Figure 8:
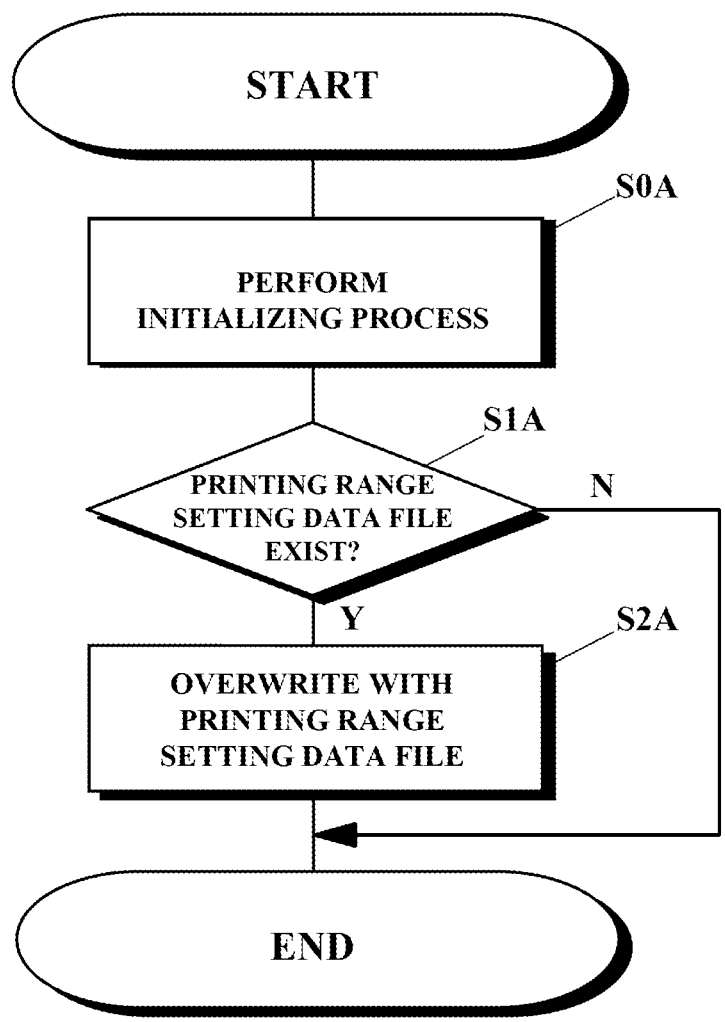
FIG. 8 is a flowchart illustrating an initializing process in a printer driver according to the third embodiment.

FIG. 8 is a flowchart illustrating the initializing process in the printer driver 16. Step S0A that describes the initializing process may be the same as Step S0 that describes the initializing process illustrated in FIG. 4 according to the first embodiment.

Next, it may be determined whether or not the printing range setting data file 15B exists in a specified folder (Step S1A). If the printing range setting data file 15B exists in the specified folder, the process control may move to Step S2A. On the other hand, if the printing range setting data file 15B does not exist in the specified folder, the process control may end the initializing process.

Data of the original printing range information set in Step S0A may be overwritten with the printing range setting data file 15B (Step S2A).

According to the third embodiment, the printing range information of the image forming apparatus 10 maybe obtained from the printer driver 13 of the image forming apparatus 10, and a printing range setting data file for the printer driver 16 of the image forming apparatus 11 may be automatically created, and the created printing range setting data file maybe installed into the printer driver 16. In the printer driver 16, after the data of the original printing range information is set in the initializing process, the data of the original printing range information may be overwritten with the printing range setting data file if the printing range setting data file exists. With this operation, the user may change the printing range of the image forming apparatus 11 corresponding to the printer driver 13 easily without obtaining the printer driver 13 of the image forming apparatus 10, by being provided with the printing range setting data file 15B from the manufacturer or the dealer of the image forming apparatus 11.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention claimed is:

1. A method comprising:
    starting, using a computer processor, a first printer driver for a first image forming apparatus;
    obtaining printing range information of the first image forming apparatus from the first printer driver;
    creating a plug-in file based on the printing range information of the first image forming apparatus, wherein the plug-in file includes a function for changing a printing range for a second printer driver for a second image forming apparatus;
    installing the plug-in file into the second printer driver;
    setting original printing range information for the second printer driver; and
    executing the function included in the installed plug-in file when the installed plug-in file exists,
    wherein setting the original printing range information for the second printer driver comprises setting, when initializing the second printer driver, the original printing range information for the second printer driver; and
    executing the function included in the installed plug-in file when the installed plug-in file exists comprises executing, after setting the original printing range information, the function included in the installed plug-in file when the installed plug-in file exists.

2. The method according to claim 1, wherein creating the plug-in file based on the printing range information of the first image forming apparatus comprises assigning printing range information data from the first image forming apparatus to a parameter included in a template file.

3. The method according to claim 1, wherein installing the plug-in file into the second printer driver comprises storing the plug-in file in a specified folder.

4. A method comprising:
    starting, using a computer processor, a first printer driver for a first image forming apparatus;
    obtaining printing range information of the first image forming apparatus from the first printer driver;
    creating printing range change source code based on the printing range information of the first image forming apparatus, wherein the printing range change source code includes a function for changing a printing range for a second printer driver for a second image forming apparatus;
    creating a first object file by compiling source code of the second printer driver;
    creating a second object file by compiling the printing range change source code;
    building a new second printer driver by linking the first object file and the second object file;

setting original printing range information to the source code of the second printer driver; and executing the function included in the printing range change source code, wherein setting the original printing range information to the source code of the second printer driver comprises setting, when initializing the second printer driver, the original printing range information to the source code of the second printer driver; and executing the function included in the printing range change source code comprises executing, after setting the original printing range information to the source code of the second printer driver, the function included in the printing range change source code.

5. The method according to claim 4, wherein the first object file and the second object file are linked by a linker.

6. A method comprising:

starting, using a computer processor, a first printer driver for a first image forming apparatus;

obtaining printing range information of the first image forming apparatus from the first printer driver;

creating a printing range setting data file based on the printing range information of the first image forming apparatus, wherein the printing range setting data file includes a function for changing a printing range for a second printer driver for a second image forming apparatus;

installing the printing range setting data file into the second printer driver;

setting original printing range information to the second printer driver; and executing the function included in the installed printing range setting data file if the installed printing range setting data file exists, wherein setting the original printing range information to the second printer driver comprises setting, when initializing the second printer driver, the original printing range information to the second printer driver; and executing the function included in the installed printing range setting data file if the installed printing range setting data file exists comprises executing, after setting the original printing range information to the second printer driver, the function included in the installed printing range setting data file if the installed printing range setting data file exists.

7. The method according to claim 6, wherein the original printing range information is overwritten by the installed printing range setting data file by executing the function.

8. The method according to claim 7, wherein the installed printing range setting data file comprises a table including the printing range setting data for overwriting.

9. The method according to claim 6, wherein installing the printing range setting data file into the second printer driver comprises storing the printing range setting data file in a specified folder.

* * * * *